(12) United States Patent
Jiang

(10) Patent No.: US 8,954,116 B2
(45) Date of Patent: Feb. 10, 2015

(54) ELECTRONIC TERMINAL AND RING PROMPT METHOD OF THE ELECTRONIC TERMINAL

(75) Inventor: Wei Jiang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 43 days.

(21) Appl. No.: 13/978,401

(22) PCT Filed: Apr. 18, 2011

(86) PCT No.: PCT/CN2011/072950
§ 371 (c)(1),
(2), (4) Date: Jul. 25, 2013

(87) PCT Pub. No.: WO2012/092731
PCT Pub. Date: Jul. 12, 2012

(65) Prior Publication Data
US 2014/0004909 A1    Jan. 2, 2014

(30) Foreign Application Priority Data
Jan. 6, 2011   (CN) .......................... 2011 1 0002317

(51) Int. Cl.
H04B 1/38    (2006.01)
H04M 19/04   (2006.01)
H04M 1/03    (2006.01)

(52) U.S. Cl.
CPC ............ *H04M 19/042* (2013.01); *H04M 19/04* (2013.01); *H04M 1/035* (2013.01)
USPC .................. 455/567; 379/373.01; 379/375.01

(58) Field of Classification Search
USPC ............. 455/418, 401, 567; 379/372–373.03, 379/375.01
See application file for complete search history.

(56) References Cited

U.S. PATENT DOCUMENTS

| 7,542,786 B2 * | 6/2009 | Westwood et al. ........... 455/567 |
| 8,548,154 B2 * | 10/2013 | Liu et al. ....................... 379/257 |
| 2011/0151939 A1 * | 6/2011 | Wang ............................. 455/567 |

FOREIGN PATENT DOCUMENTS

| CN | 201315622 Y | 9/2009 |
| CN | 101848278 A | 9/2010 |
| EP | 1443804 A2  | 8/2004 |
| GB | 2313978 A   | 12/1997 |
| JP | 62140600 A  | 6/1987 |

OTHER PUBLICATIONS

International Search Report for PCT/CN2011/072950 dated Sep. 19, 2011.

* cited by examiner

*Primary Examiner* — Ajit Patel
(74) *Attorney, Agent, or Firm* — Ling Wu; Stephen Yang; Ling and Yang Intellectual Property

(57) ABSTRACT

The invention discloses an electronic terminal and a ringtone prompt method for the electronic terminal. A control module of the electronic terminal instructs a ringtone sound source module to play a test ringtone signal, and instructs a ringtone channel switch system to switch all sound channels one by one to output the test ringtone signal; a sound collection module collects an exterior sound signal while each channel is outputting the test ringtone signal and feeds it back to a signal processing module; the signal processing module processes the intensity of the test ringtone signal therein; the control module determines the output channel of a prompt ringtone signal according to the processing result of the collected signal, instructs the ringtone channel switch system to switch to the determined output channel, and instructs the ringtone sound source module to play the prompt ringtone signal.

20 Claims, 3 Drawing Sheets

ELECTRONIC TERMINAL AND RING PROMPT METHOD OF THE ELECTRONIC TERMINAL

TECHNICAL EFFECT

The invention relates to the technical filed of electronic terminal product, and in particular to an electronic terminal and a ringtone prompt method for the electronic terminal.

BACKGROUND ART

With the development of integrated electronics technology and communication technology, various electronic terminals have become important assistant devices in people's life and work, for example, mobile phone, laptop, PC, PDA, electronic clock, GPS navigator, electronic map terminal, etc. A ringtone prompt function is generally provided in various electronic terminals, for example a mobile phone is provided with functions such as ringtone prompt for incoming calls and alarm ringtone prompt, a laptop has booting sound and powering-off sound, an electronic alarm clock has alarming ringtone prompt, and a GPS navigator has functions such as path voice prompt.

Taking the common mobile phone as an example, the basic function of a mobile phone is to provide voice conversation, and when a mobile phone is called, a ringtone prompt may be used to prompt the incoming call. Due to high mobility of the mobile phone, the mobile phone may be placed in any state, for example, in the hand, placed on the table, in the pocket or in the handbag, when the mobile phone is in the standby state. In the above cases, the speaker sound holes of the mobile phone may be easily covered by external objects, and the prompt effect for incoming calls will inevitably be affected, thus affecting the ringtone prompt effect when the user perceives the incoming calls, and even resulting in the missing of important calls.

Therefore, when the speaker sound holes of an electronic product such as a mobile phone are covered by surrounding objects, the ringtone or voice prompt effect may be very poor, for example, a user of mobile phone may miss important calls due to not hearing the ringtone, or a user of an electronic alarm clock may miss important moments. Thus, how to improve the ringtone prompt effect of an electronic terminal becomes a technical problem to be solved.

SUMMARY OF THE INVENTION

The technical problem to be solved in the invention is to provide an electronic terminal and a ringtone prompt method for the electronic terminal, so as to solve the problem that when the speaker sound holes are covered by surrounding objects, the ringtone or voice prompt effect may be very poor, and to improve the ringtone prompt effect of the electronic terminal.

In order to solve the above problem, the invention provides an electronic terminal, comprising:

a ringtone sound source module configured to play a ringtone;

a control module configured to control the ringtone sound source module to send out a specified sound signal and control switching of ringtone channels; the specified sound signal comprises a test sound signal and a prompt ringtone signal;

a plurality of sound channels configured to transmit the sound signal to outside of the electronic terminal;

a sound collection module configured to collect an exterior sound signal;

a signal processing module configured to process the collected sound signal; and a ringtone channel switch system configured to control switching of the sound channels; wherein:

the control module instructs the ringtone sound source module to play a test ringtone signal, and instructs the ringtone channel switch system to switch all sound channels one by one to output the test ringtone signal, and the sound collection module collects the exterior sound signal while each channel is outputting the test ringtone signal and feeds it back to the signal processing module, and the signal processing module processes the intensity of the fed-back exterior sound signal to obtain a processing result, and the control module determines an output channel of the prompt ringtone signal according to the processing result, instructs the ringtone channel switch system to switch to the determined output channel, and instructs the ringtone sound source module to play the prompt ringtone signal.

There are one or more output channels of the prompt ringtone signal determined by the control module according to the processing result.

The signal processing module is configured to receive the exterior sound signal fed back by the sound collection module and record a corresponding sound channel, and after completing the record of all sound channels, sequence the intensities of the exterior sound signals corresponding to channels and obtain a sequencing result;

correspondingly, the control module is configured to, according to the sequencing result, determine the sound channel with a maximum intensity as the output channel of the prompt ringtone signal, or determine a plurality of sound channels with intensities greater than or equal to a limited value as the output channel of the prompt ringtone signal.

After the ringtone sound source module plays the prompt ringtone signal, if no user processing instruction is received within a threshold time, the control module re-instructs the ringtone sound source module to play the test ringtone signal, and after re-determining the output channel of the prompt ringtone signal, according to the processing result, the control module re-instructs the ringtone channel switch system to switch to the re-determined output channel, and instructs the ringtone sound source module to play the prompt ringtone signal.

The ringtone sound source module comprises: a speaker, a speaker rear sound cavity and a speaker front sound cavity sound guide tube, wherein, the speaker is configured to generate the specified sound signal;

the speaker rear sound cavity is configured to promote the volume and effect of the specified sound signal;

the speaker front sound cavity sound guide tube is configured to transmit the specified sound signal.

The sound collection module is a microphone or a sound collection sensor.

The electronic terminal is a mobile phone, laptop, tablet computer, electronic alarm clock, personal digital assistant (PDA) or GPS navigator.

The present invention further provides a ringtone prompt method for an electronic terminal, characterized in comprising the following steps of:

step one, playing a test ringtone signal, switching all sound channels one by one to output the test ringtone signal;

step two, collecting an exterior sound signal while each channel is outputting the test ringtone signal, processing the intensity of the collected sound signal to obtain a processing result;

step three, determining an output channel of a prompt ringtone signal according to the processing result;

step four, switching the output channel of the prompt ringtone signal to the determined output channel, and playing the prompt ringtone signal.

There are one or more output channels of the prompt ringtone signal determined according to the processing result.

The step of processing the intensity of the collected sound signal to obtain a processing result in step two comprises:

receiving the fed-back exterior sound signal and recording a corresponding sound channel, and after completing record of all sound channels, sequencing the intensities of the exterior sound signals corresponding to channels and obtaining a sequencing result.

The output channel of the prompt ringtone signal is determined according to the sequencing result in step three, and the determined output channel of the prompt ringtone signal is a sound channel with a maximum intensity or a plurality of sound channels with intensities greater than or equal to a limited value.

The method further comprises: repeating steps one to four after the prompt ringtone signal is played if no user processing instruction is received within a threshold time.

A mobile phone only has one speaker sound hole in the past, and if the speaker sound hole is blocked by objects, the effect of incoming call ringtone prompt will be greatly deteriorated. However, in the invention, a plurality of speaker sound holes can be provided, channels can be switched according to the volumes of prompt ringtones of different sound holes, and one or more channels (for example selecting the channel with the maximum volume) can be selected as the final output channel of the prompt ringtone signal. In this way, the ringtone prompt effect of the electronic terminal can be improved when the speaker sound hole is covered by objects.

PREFERRED EMBODIMENTS OF THE INVENTION

Figure 1:
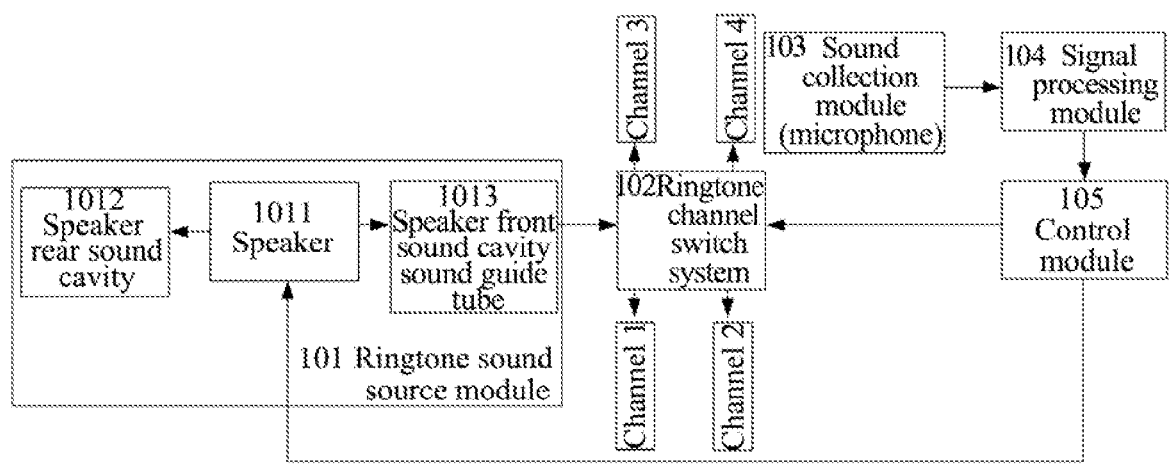
FIG. 1 illustrates the specific switch system and electronic terminal having a plurality of sound holes.

In order to make the purpose, technical solution and advantages of the present invention clearer, the present invention will be further described below in detail with reference to the drawings.

As to the problem that the ringtone prompt effect of an electronic terminal such as a mobile phone is affected when the electronic terminal is covered by external objects, the invention provides a design structure of an electronic terminal and a method for ringtone prompt for improving the ringtone prompt effect of the incoming calls of an electronic terminal such as a mobile phone.

The electronic terminal of the present invention comprises:

a control module configured to control the ringtone sound source module to send out a specified sound signal and control switching of ringtone channels; the specified sound signal comprises a test sound signal and a prompt ringtone signal;

a ringtone sound source module configured to implement the function of playing a ringtone; the ringtone sound source module comprises: a speaker, a speaker rear sound cavity and a speaker front sound cavity sound guide tube;

a plurality of sound channels, connected to the ringtone sound source module, configured to transmit the sound signal to outside of the electronic terminal;

a ringtone channel switch system configured to control the switching of the sound channels for transmitting the ringtone signal out of the mobile terminal from the ringtone sound source module;

a sound collection module configured to collect a ringtone signal played by the electronic terminal itself; furthermore, the electronic terminal can also collect the surrounding sound signals; the sound collection module is a microphone or a sound collection sensor; and a signal processing module configured to calculate the energy intensity of the collected sound signal according to the sound signal obtained by collection of the sound collection module, compare the intensities of the collected sound signals in multiple times and record a maximum value.

The ringtone channel switch system comprises a mini-electromagnetic valve with an input of single channel and an output of multiple channels capable of selectively controlling the switching, wherein only one channel among multiple output channels can be switched for outputting sound signals at the same moment. The number of output channels should be determined according to the actual condition of the appearance design of the mobile phone, i.e., according to the actual number of the sound channels. After determining the actual sound channel for finally outputting the ringtone signal, the ringtone sent out by the ringtone sound source module is output by switching to this sound channel. Furthermore, as an improvement thereto, a plurality of sound channels may be selected as the final output channel for the sound signal, for example, the sound channel with the maximum intensity and the sound channel with the secondary intensity are selected. However, in this embodiment, the switching can only be made one by one when testing the intensities of various channels, and one channel is tested each time.

When a ringtone prompt is required, the control module instructs the ringtone sound source module to play a test ringtone signal, and instructs the ringtone channel switch system to switch all sound channels one by one to output the test ringtone signal, and the sound collection module collects the exterior sound signal while each channel is outputting the test ringtone signal and feeds it back to the signal processing module, and the signal processing module processes the intensities of the test ringtone signals therein, and the control module determines an output channel of the prompt ringtone signal according to the processing result of the collected signal, instructs the ringtone channel switch system to switch to the determined output channel, and instructs the ringtone sound source module to play the prompt ringtone signal.

The process of ringtone prompt will be described below with reference to the structural modules of the electronic terminal by taking an electronic terminal with four sound holes as an example.

When ringtone prompt is required, the speaker of the ringtone sound source module sends out a test ringtone signal (for example single-frequency ringtone signal of 1 KHz, and the volume of the ringtone signal may be set to be the medium volume of the outside ringtone of the electronic terminal), and the test ringtone signal is transmitted into the ringtone channel switch system via the front sound cavity sound guide tube of the speaker;

after the test ringtone signal rings, the ringtone channel switch system implements switching of four sound hole channels in sequence with a fixed time interval according to the instruction of the control module, and the test ringtone signal is transmitted out of the electronic terminal via the four sound hole channels in turn; after completing switching of all sound hole channels, the ringtone sound source module stops playing the test ringtone signal; wherein, during the period of opening of each sound hole channel, the sound collection module collects sound signals around the electronic terminal in turn, and sends the collected sound signals to the signal processing module; the signal processing module records the intensities of the test ringtone signal in the collected sound signals and records the sequence number of the ringtone output channel at the corresponding moment.

Upon completion of switching of all sound hole channels, the signal processing module determines the moment at which the value of the test ringtone signal is maximum in the entire switching process of the ringtone output channel, and finds out the recorded sequence number corresponding to the output ringtone channel according to the maximum-value moment, thereby obtaining the output channel with a relatively high ringtone volume.

The control module, after determining the finally selected ringtone output channel, will send a channel switch instruction to the ringtone channel switch system to open the output channel with a relatively high ringtone volume; the number of the selected output channels may be one or more.

After the channel is opened, the control module instructs the ringtone sound source module to play the incoming call prompt ringtone (which may be preset by the user, or defaulted in the system, or set by the third party).

Furthermore, if the user does not make any corresponding processing (for example the user of the mobile phone answers the call) after the prompt ringtone rings for a long period, the electronic terminal will repeat the above process, and the output channel of the prompt ringtone will be reselected and determined, so as to avoid sudden deterioration of the prompt ringtone effect caused by sudden change of the exterior environment.

When the electronic terminal needs to play the ringtone prompt, the influence of exterior objects on the effect of the ringtone prompt can be avoided, thereby improving the ringtone prompt effect of the electronic terminal such as a mobile phone, and enhancing the user's ability of perceiving the ringtone prompt for incoming calls of the mobile phone. The electronic terminal may be a mobile phone, or a terminal with communication function and capable of ringtone prompting (e.g., tablet computer, E-book reader, laptop etc.), or an electronic terminal with voice prompt function (e.g., GPS navigator).

Example 1

A Mobile Terminal with Enhanced Ringtone Prompt Effect

As shown in FIG. 1, the mobile terminal with enhanced ringtone prompt effect comprises:

a mobile terminal ringtone sound source module 101, configured to implement the generation of a mobile terminal ringtone and transmission of the ringtone, wherein this module comprises a mobile terminal speaker 1011 for generating a ringtone, a mobile terminal speaker rear sound cavity 1012 for improving the volume and effect of the ringtone, and a mobile terminal speaker front sound cavity sound guide tube 1013 for transmitting the ringtone;

a ringtone channel switch system 102, configured to provide a channel switching function for transmitting the mobile terminal ringtone out of the mobile terminal;

a mobile terminal sound collection module 103, configured to collect sound signals outside the mobile terminal;

in this case, the mobile terminal sound collection module may be a microphone;

a mobile terminal signal processing module 104, configured to provide the processing and judging function for various signals inside the mobile terminal; and a mobile terminal control module 105, configured to control the function implementation and state switching of various modules of the mobile terminal.

Figure 2:
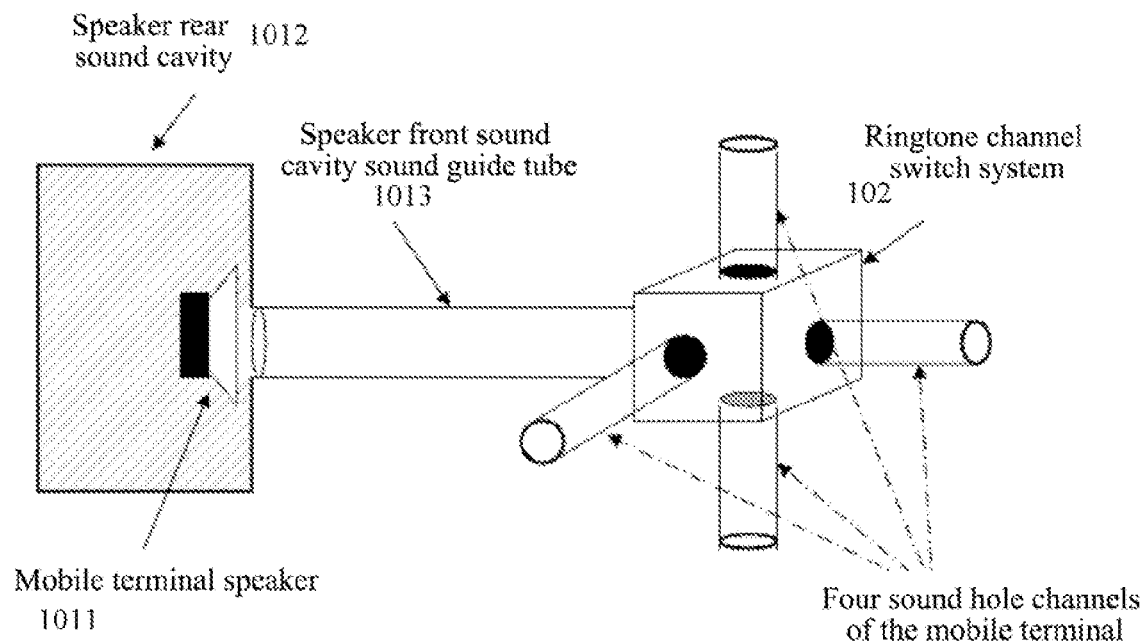
FIG. 2 illustrates a ringtone sound source module and ringtone channel switch system of a mobile phone.

Furthermore, as shown in FIG. 2, it provides the connection relationship between the mobile terminal ringtone sound source module 101 and ringtone channel switch system 102, with the left part being the mobile terminal ringtone sound source module 101, which comprises a mobile terminal speaker 1011, a speaker rear sound cavity 1012, and a speaker front sound cavity sound guide tube 1013; the right part being the ringtone channel switch system 102, which is connected with the speaker front sound cavity sound guide tube 1013, and controls the switching of four sound hole channels 205 for outputting the ringtone signal through a mini-electromagnetic valve.

Figure 3:
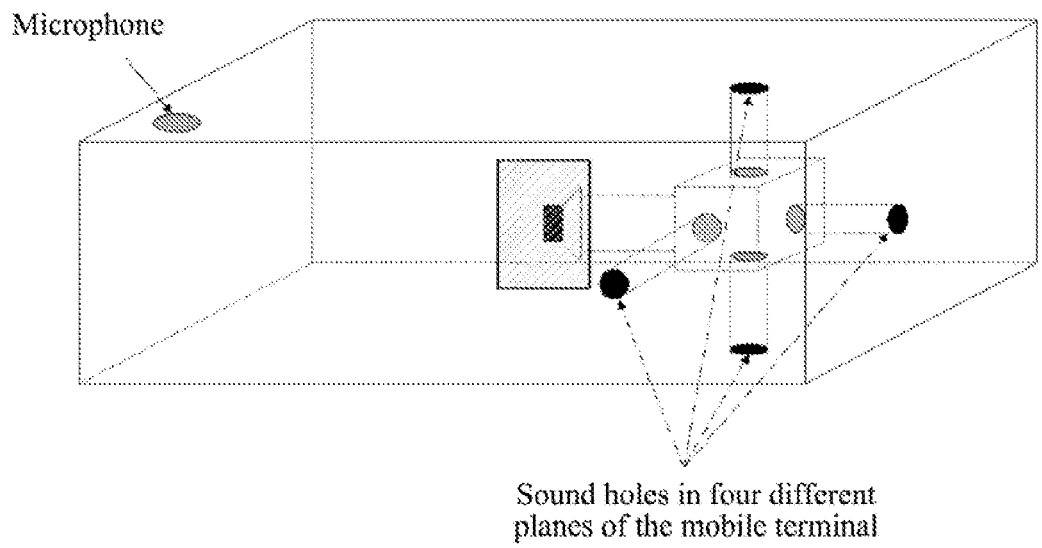
FIG. 3 illustrates the sound holes in four different planes and microphone of a mobile phone.

Furthermore, as shown in FIG. 3, this figure mainly depicts the sound holes in four different planes of the mobile terminal, and shows position of the mobile terminal sound collection module, i.e., microphone. The position of the microphone is only for illustration, and the specific position may be set according to the appearance of the mobile terminal.

Example 2

Method Example for Improving the Ringtone Prompt Effect of a Mobile Terminal

Figure 4:
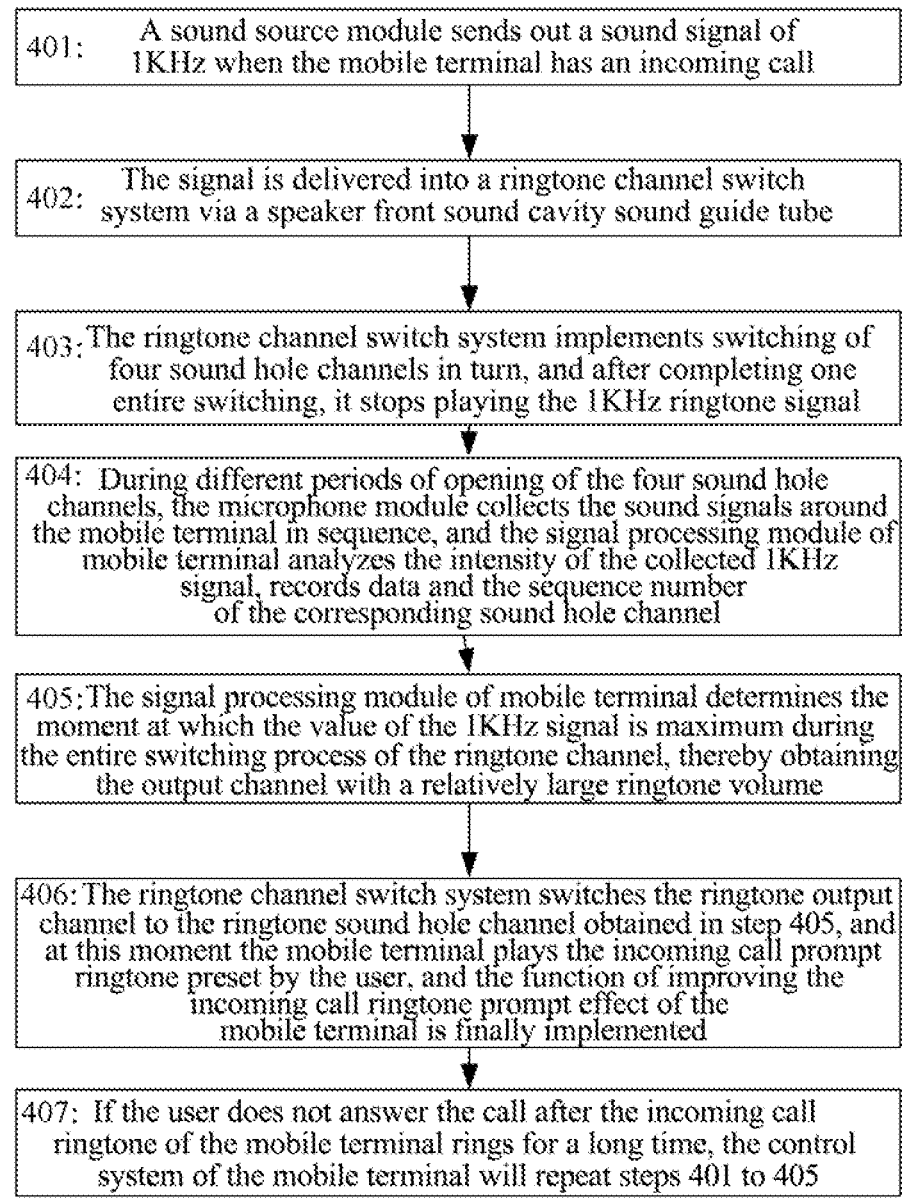
FIG. 4 is a flowchart of the steps for improving the ringtone prompt effect of incoming calls of a mobile phone.

As shown in FIG. 4, the flow of improving the ringtone prompt effect of a mobile terminal comprises the following steps:

401, a sound source module sends out a test sound signal of 1 KHz when the mobile terminal has an incoming call;

402, the test sound signal is delivered into a ringtone channel switch system via a speaker front sound cavity sound guide tube;

403, the ringtone channel switch system implements the switching of four sound hole channels in turn, and after completing one entire switching, playing the 1 KHz ringtone signal is stopped;

404, during different periods of opening of the four sound hole channels, the microphone module collects the sound signals around the mobile terminal in sequence, and the mobile terminal signal processing module analyzes the intensity of the collected 1 KHz signal, records data and the sequence number of the corresponding sound hole channel;

405, the signal processing module of mobile terminal determines the moment at which the value of the 1 KHz signal is maximum in the entire switching process of the ringtone channel, thereby obtaining the output channel with a relatively high ringtone volume;

406, the ringtone channel switch system switches the ringtone output channel to the ringtone sound hole channel obtained in step 405, and at the moment the mobile terminal plays the incoming call prompt ringtone preset by the user, and finally implements the function of improving the incoming call ringtone prompt effect of the mobile terminal;

407, if the user does not answer the call after the incoming call ringtone of the mobile terminal rings for a long time, the control system of the mobile terminal will repeat steps 401 to 405.

In the invention, a plurality of output channels may also be determined in step 405, and several channels with a relatively large intensity of the collected test signal may be selected from all of output channels.

In the design structure of the electronic terminal of the invention, the influence of the exterior objects on the ringtone prompt effect is avoided when the incoming call ringtone of the electronic terminal is played, thereby improving the incoming call ringtone prompt effect of the electronic terminal such as a mobile terminal, and enhancing the effect of the user perceiving the incoming call ringtone prompt of the mobile terminal. The electronic terminal may be a mobile terminal, or a terminal with communication function and capable of ringtone prompting, for example tablet computer, E-book reader, laptop etc. As for the embodiments of other types of electronic terminals (for example electronic alarm clock, laptop, PDA, GPS navigator etc.), reference may be made to the specific application of Examples 1 and 2, and the function of improving the ringtone prompt effect can be achieved after making proper adjustment.

Only embodiments of the present invention are described above, and they are not intended to limit the present invention. For a person having ordinary skill in the art, the invention may have various modifications and changes. Any modification, equivalent substitution and improvement made within the spirit and principle of the invention should be within the protection scope of the claims of the present invention.

INDUSTRIAL APPLICABILITY

In the invention, a plurality of speaker sound holes can be provided, channels can be switched according to the volumes of prompt ringtones of different sound holes, and one or more channels (for example selecting the channel with the maximum volume) can be selected as the final output channel of the prompt ringtone signal. In this way, the ringtone prompt effect of the electronic terminal can be improved when the speaker sound hole is covered by objects, therefore the industrial application is strong.

What is claimed is:

1. An electronic terminal, comprising:
    a ringtone sound source module configured to play a ringtone;
    a control module configured to control the ringtone sound source module to send out a specified sound signal and control switching of ringtone channels; wherein the specified sound signal comprises a test sound signal and a prompt ringtone signal;
    a plurality of sound channels configured to transmit sound signals to outside of the electronic terminal;
    a sound collection module configured to collect an exterior sound signal;
    a signal processing module configured to process the collected sound signal; and
    a ringtone channel switch system configured to control switching of the sound channels;
    wherein:
        the control module instructs the ringtone sound source module to play a test ringtone signal, and instructs the ringtone channel switch system to switch all sound channels one by one to output the test ringtone signal, and the sound collection module collects the exterior sound signal while each channel is outputting the test ringtone signal and feeds back the exterior sound signal to the signal processing module, and the signal processing module processes the intensity of the fed-back exterior sound signal to obtain a processing result, and the control module determines an output channel of the prompt ringtone signal according to the processing result, instructs the ringtone channel switch system to switch to the determined output channel, and instructs the ringtone sound source module to play the prompt ringtone signal.

2. The electronic terminal according to claim 1, wherein the number of the output channel of the prompt ringtone signal determined by the control module according to the processing result is one or more.

3. The electronic terminal according to claim 1, wherein the signal processing module is configured to receive the exterior sound signal fed back by the sound collection module and record a corresponding sound channel, and after completing record of all sound channels, sequence the intensities of the exterior sound signals corresponding to various channels and obtain a sequencing result;
    correspondingly, the control module is configured to, according to the sequencing result, determine a sound channel with a maximum intensity as the output channel of the prompt ringtone signal, or determine a plurality of sound channels with intensities greater than or equal to a limited value as the output channel of the prompt ringtone signal.

4. The electronic terminal according to claim 1, wherein after the ringtone sound source module plays the prompt ringtone signal, if no user processing instruction is received within a threshold time, the control module re-instructs the ringtone sound source module to play the test ringtone signal, and after re-determining the output channel of the prompt ringtone signal according to the processing result, the control module re-instructs the ringtone channel switch system to switch to the re-determined output channel, and instructs the ringtone sound source module to play the prompt ringtone signal.

5. The electronic terminal according to claim 1, wherein the ringtone sound source module comprises: a speaker, a speaker rear sound cavity and a speaker front sound cavity sound guide tube, wherein
    the speaker is configured to generate the specified sound signal;
    the speaker rear sound cavity is configured to promote the volume and effect of the specified sound signal;
    the speaker front sound cavity sound guide tube is configured to transmit the specified sound signal.

6. The electronic terminal according to claim 1, wherein the sound collection module is a microphone or a sound collection sensor.

7. The electronic terminal according to claim 6, wherein the electronic terminal is a mobile phone, laptop, tablet computer, electronic alarm clock, personal digital assistant (PDA) or GPS navigator.

8. A ringtone prompt method for an electronic terminal, comprising the following steps of:
    step one, playing a test ringtone signal, switching all sound channels one by one to output the test ringtone signal;
    step two, collecting an exterior sound signal while each channel is outputting the test ringtone signal, processing the intensity of the collected sound signal to obtain a processing result;
    step three, determining an output channel of a prompt ringtone signal according to the processing result;
    step four, switching the output channel of the prompt ringtone signal to the determined output channel, and playing the prompt ringtone signal.

9. The method according to claim 8, wherein the number of the output channel of the prompt ringtone signal determined according to the processing result is one or more.

10. The method according to claim 8, wherein the step of processing the intensity of the collected sound signal to obtain a processing result in step two comprises:
receiving the fed-back exterior sound signal and recording a corresponding sound channel, and after completing record of all sound channels, sequencing the intensities of the exterior sound signals corresponding to various channels and obtaining a sequencing result.

11. The method according to claim 8, wherein the output channel of the prompt ringtone signal is determined according to the sequencing result in step three, and the determined output channel of the prompt ringtone signal is a sound channel with a maximum intensity or a plurality of sound channels with intensities greater than or equal to a limited value.

12. The method according to claim 8, wherein the method further comprises: repeating steps one to four after the prompt ringtone signal is played if no user processing instruction is received within a threshold time.

13. The electronic terminal according to claim 2, wherein the ringtone sound source module comprises: a speaker, a speaker rear sound cavity and a speaker front sound cavity sound guide tube, wherein
the speaker is configured to generate the specified sound signal;
the speaker rear sound cavity is configured to promote the volume and effect of the specified sound signal;
the speaker front sound cavity sound guide tube is configured to transmit the specified sound signal.

14. The electronic terminal according to claim 3, wherein the ringtone sound source module comprises: a speaker, a speaker rear sound cavity and a speaker front sound cavity sound guide tube, wherein
the speaker is configured to generate the specified sound signal;
the speaker rear sound cavity is configured to promote the volume and effect of the specified sound signal;
the speaker front sound cavity sound guide tube is configured to transmit the specified sound signal.

15. The electronic terminal according to claim 4, wherein the ringtone sound source module comprises: a speaker, a speaker rear sound cavity and a speaker front sound cavity sound guide tube, wherein
the speaker is configured to generate the specified sound signal;
the speaker rear sound cavity is configured to promote the volume and effect of the specified sound signal;
the speaker front sound cavity sound guide tube is configured to transmit the specified sound signal.

16. The electronic terminal according to claim 2, wherein the sound collection module is a microphone or a sound collection sensor.

17. The electronic terminal according to claim 3, wherein the sound collection module is a microphone or a sound collection sensor.

18. The method according to claim 9, wherein the method further comprises:
repeating steps one to four after the prompt ringtone signal is played if no user processing instruction is received within a threshold time.

19. The method according to claim 10, wherein the method further comprises: repeating steps one to four after the prompt ringtone signal is played if no user processing instruction is received within a threshold time.

20. The method according to claim 11, wherein the method further comprises: repeating steps one to four after the prompt ringtone signal is played if no user processing instruction is received within a threshold time.

* * * * *